US007606480B2

(12) United States Patent
Chen

(10) Patent No.: US 7,606,480 B2
(45) Date of Patent: Oct. 20, 2009

(54) PHOTOGRAPHIC ILLUMINATING DEVICE AND CAMERA

(75) Inventor: Zhaoxiang Chen, Kawasaki (JP)

(73) Assignee: Nikon Corporation, Tokyo (JP)

(*) Notice: Subject to any disclaimer, the term of this patent is extended or adjusted under 35 U.S.C. 154(b) by 239 days.

(21) Appl. No.: 11/248,178

(22) Filed: Oct. 13, 2005

(65) Prior Publication Data

US 2006/0087253 A1 Apr. 27, 2006

(30) Foreign Application Priority Data

Oct. 21, 2004 (JP) ............................ 2004-306955

(51) Int. Cl.
*G03B 15/03* (2006.01)

(52) U.S. Cl. ......................... 396/164; 396/61; 396/182; 348/371

(58) Field of Classification Search ................. 396/164, 396/182, 156, 165-167, 104, 109, 61; 315/188, 315/241, 241 P; 348/371; *G03B 15/03*
See application file for complete search history.

(56) References Cited

U.S. PATENT DOCUMENTS 4,485,336 A * 11/1984 Yoshiyama et al. ...... 315/241 P
4,853,600 A * 8/1989 Zeltner et al. ............ 315/241 P
5,107,292 A * 4/1992 Tanaka et al. ............... 396/156
5,150,146 A * 9/1992 Ueda et al. .................. 396/104
5,532,555 A * 7/1996 Yamada ................... 315/241 P
5,794,076 A * 8/1998 Farrington et al. ............ 396/25
5,895,128 A 4/1999 Kishimoto et al.
6,753,920 B1 * 6/2004 Momose et al. ............. 348/371
7,076,162 B2 * 7/2006 Yamashita .................. 396/157
2005/0094029 A1 * 5/2005 Aoki .......................... 348/372
2005/0157207 A1 * 7/2005 Voss et al. .................. 348/371
2005/0157208 A1 * 7/2005 Park et al. ................... 348/371

FOREIGN PATENT DOCUMENTS

JP 07-104356 4/1995
JP 07-104357 4/1995
JP 2002-14395 1/2002
JP 2002-214677 7/2002
JP 2002-229102 8/2002
JP 2002-258363 9/2002
JP 2002-270382 9/2002
JP 2004-077597 A * 3/2004

* cited by examiner

*Primary Examiner*—Melissa J Koval
*Assistant Examiner*—Linda B Smith
(74) *Attorney, Agent, or Firm*—Staas & Halsey LLP

(57) ABSTRACT

A photographic illuminating device comprises a discharge-controlled illumination unit that emits illuminating light in response to a light emission instruction, a current-controlled illumination unit that emits illuminating light in response to a light emission instruction, a high voltage circuit that generates a high voltage needed for discharge light emission at the discharge-controlled illumination unit and a current control circuit that supplies to the current-controlled illumination unit a current needed for light emission at the current-controlled illumination unit by using the high voltage generated at the high voltage circuit.

32 Claims, 4 Drawing Sheets

PHOTOGRAPHIC ILLUMINATING DEVICE AND CAMERA

INCORPORATION BY REFERENCE

The disclosure of the following priority application is herein incorporated by reference: Japanese Patent Application No. 2004-306955 filed Oct. 21, 2004

BACKGROUND OF THE INVENTION

1. Field of the Invention

The present invention relates to an illuminating device that illuminates the subject being photographed.

2. Description of Related Art

There is an illuminating device used to illuminate the subject being photographed, which includes a discharge-controlled light source constituted with a Xe discharge tube and a current-controlled light source constituted with LEDs (see Japanese Laid Open Patent Publication No. H10-206942). Since the two light sources are turned on by adopting methods different from each other the discharge control for the Xe discharge tube and the drive control for the LED are normally executed separately. A circuit block for the Xe discharge tube and a circuit block for the LED light emission unit are connected in parallel to a source battery E, and the former circuit block executes the discharge control for the Xe discharge tube whereas the latter circuit block executes the LED drive control.

SUMMARY OF THE INVENTION

The structure described above, which requires the separate circuit blocks, one dedicated to the discharge-controlled light source and the other dedicated to the current-controlled light source, leads to an increase in the size and mass of the illuminating device as well as an increase in the manufacturing cost.

According to the first aspect of the invention, a photographic illuminating device comprises: a discharge-controlled illumination unit that emits illuminating light in response to a light emission instruction; a current-controlled illumination unit that emits illuminating light in response to a light emission instruction; a high voltage generating circuit that generates a high voltage needed for discharge light emission at the discharge-controlled illumination unit; and a current control circuit that supplies a current needed for light emission at the current-controlled illumination unit by using the high voltage-generated at the high voltage generating circuit.

According to the second aspect of the invention, in the photographic illuminating device according to the first aspect, it is preferred that the high voltage generating circuit comprises a voltage raising circuit that raises a battery voltage and a capacitive element that is charged with the voltage having been raised by the voltage raising circuit; the discharge-controlled illumination unit executes discharge light emission by using energy stored at the charged capacitive element; and the current control circuit supplies a current to the current-controlled illumination unit by using the energy stored at the charged capacitive element.

According to the third aspect of the invention, in the photographic illuminating device according to the first aspect, it is preferred that the high voltage generating circuit comprises a voltage raising circuit that raises a battery voltage, and a first capacitive element and a second capacitive element that are charged with the voltage having been raised by the voltage raising circuit; the discharge-controlled illumination unit executes discharge light emission by using energy stored at the charged first capacitive element; and the current control circuit supplies a current to the current-controlled illumination unit by using energy stored at the charged second capacitive element.

According to the fourth aspect of the invention, it is preferred that the photographic illuminating device according to any one of the first through the third aspect, further comprises a control unit that controls light emission instructions provided to the discharge-controlled illumination unit and the current-controlled illumination unit; and a voltage detection circuit that detects the voltage generated by the high voltage generating circuit; and if the voltage detection circuit detects the high voltage raised at the voltage raising circuit to be equal to or lower than a first predetermined voltage value, the control unit issues a light emission instruction to the current control circuit without issuing a light emission instruction to the discharge-controlled illumination unit and the current control circuit supplies a current to the current-controlled illumination unit by using the energy stored at the charged capacitive element.

According to the fifth aspect of the invention, in the photographic illuminating device according to any one of the first through the fourth aspect, it is preferred that if the voltage detection circuit detects the voltage generated at the high voltage generating circuit to be equal to or higher than a second predetermined voltage value, the control unit issues a light emission instruction to the current-controlled illumination unit without providing a light emission instruction to the discharge-controlled illumination unit; the first predetermined voltage value indicates a voltage needed in the discharge light emission at the discharge-controlled illumination unit; and the second predetermined voltage value, which is equal to or lower than the first predetermined voltage value, indicates a voltage needed for the light emission at the current-controlled illumination unit.

According to the sixth aspect of the invention, in a photographic illuminating device according to any one of the first through the fifth aspect, it is preferred that the current-controlled illumination unit comprises a plurality of LEDs connected in series.

According to the seventh aspect of the invention, a camera comprises: a photographic illuminating device according to any one of the first through the sixth aspect.

DESCRIPTION OF PREFERRED EMBODIMENTS

The following is an explanation of preferred embodiments of the present invention, given in reference to the drawings.

First Embodiment

Figure 1:
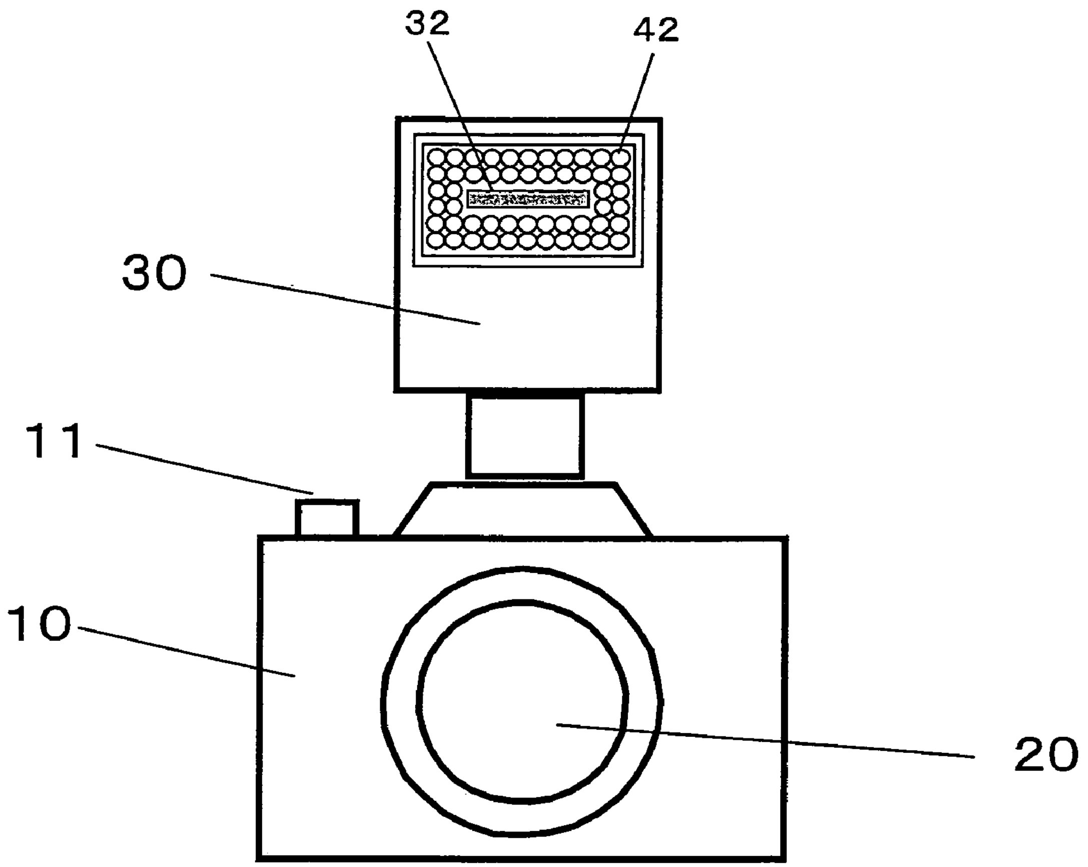
FIG. 1 is an external view of a camera system equipped with the illuminating device achieved in a first embodiment of the present invention.

FIG. 1 is an external view of a camera system equipped with the illuminating device achieved in the first embodiment of the present invention. FIG. 1 shows an exchangeable photographic lens 20 mounted at a camera body 10. A shutter release button 11 is disposed at an upper left position at the camera body 10, viewed from the subject side. An illuminating device 30 is mounted at an accessory shoe (not shown) provided at the center of the top of the camera body 10.

Figure 2:
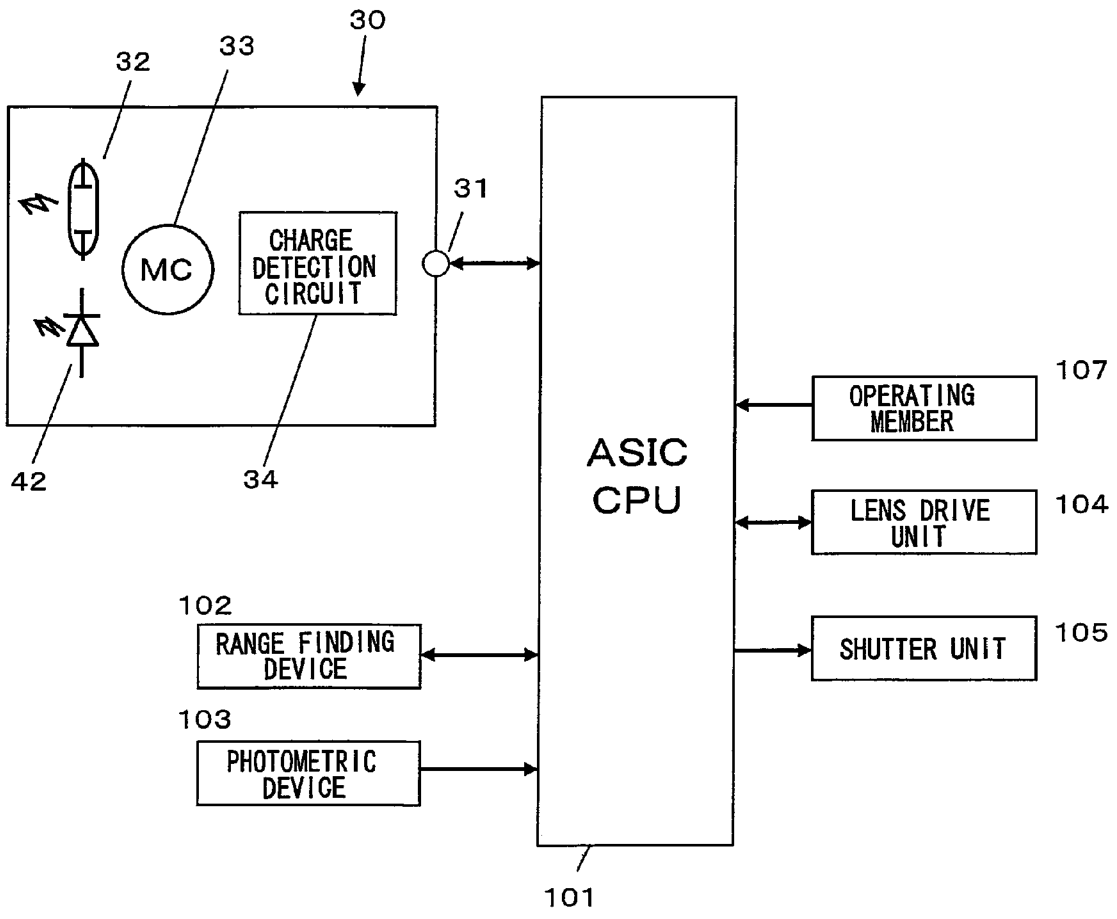
FIG. 2 is a block diagram showing the essential structure adopted in the camera system in FIG. 1.

FIG. 2 is a block diagram of the essential structure adopted in the camera system in FIG. 1. As shown in FIG. 2, the illuminating device 30 includes a xenon (Xe) discharge tube 32, a main capacitor (MC) 33, a charge (voltage) detection circuit 34 and an LED (light emitting diode) 42. The illuminating device 30 exchanges with a CPU 101 timing signals that constitute instructions for light emission start and light emission end at the Xe discharge tube 32 and the LED 42, signals indicating light outputs to be achieved, signals indicating “light emission preparation in progress (charge in progress)” and “light emission preparation complete” and the like via a communication terminal 31 at the accessory shoe. It is to be noted that while a setting for disabling light emission by the illuminating device 30 is selected at the camera body 10, the CPU 101 does not output any light emission instruction signal to the illuminating device 30.

The CPU 101 is constituted with an ASIC and the like. The CPU 101 executes specific arithmetic operations by using signals input thereto from various blocks to be detailed later and outputs control signals generated based upon the arithmetic operation results to the individual blocks.

A subject light flux having passed through the photographic lens 20 (see FIG. 1) and then having entered the camera body 10 is guided to an image-capturing element (not shown) constituted with a CCD image sensor, a CMOS image sensor or the like via a shutter unit 105. During a photographing operation, the shutter unit 105 opens a shutter curtain with predetermined timing in response to a command issued by the CPU 101 and closes the shutter curtain once the exposure period corresponding to the shutter speed elapses.

An operating member 107 includes a shutter release switch that interlocks with the shutter release button 11 (see FIG. 1) and a group of operating switches operated to select various settings, and outputs operation signals corresponding to the contents of operations performed thereat to the CPU 101. For instance, it outputs setting operation signals that correspond to setting operations performed to select a light emission enable/light emission disable setting, a red-eye reduction light emission setting and the like for the illuminating device 30 to the CPU 101.

A range finding device 102 detects the state of focal point position adjustment achieved with the photographic lens 20 and outputs a detection signal to the CPU 101. Focal point adjustment information may be obtained by adopting, for instance, a phase difference detection method of the known art. More specifically, images are formed, one on an image sensor array A and the other on an image sensor array B (not shown), with two focal point detection light fluxes having entered via different areas of the photographic lens 20. In a so-called front focus state, in which a sharply defined image of the subject is formed through the photographic lens 20 at a position further frontward relative to an estimated focal plane, the pair of subject images formed on the image sensor arrays A and B are closer to each other. In contrast, in a so-called rear focus state in which a sharply defined image of the subject is formed at a position further rearward relative to the estimated focal plane, the distance between the two subject images is greater. In the focus-matched state in which a sharply defined image of the subject is formed at the estimated focal plane, the pair of subject images on the image sensor arrays A and B become aligned relative to each other. Accordingly, by ascertaining the extent of misalignment of the pair of subject images relative to each other, the state of focal point adjustment achieved with the photographic lens 20, i.e., the defocus quantity, is determined.

The CPU 101 outputs a command for a lens drive unit 104 to drive a focus lens (not shown) included in the photographic lens 20 forward/backward along the optical axis in correspondence to the defocus quantity, and the focal point position of the photographic lens 20 is thus adjusted. It is to be noted that the focal point detection signal provided by the range finding device 102 is used as distance information corresponding to the distance (photographing distance) to a main subject.

A photometric device 103 detects a subject light quantity through the photographic lens 20 and outputs a detection signal to the CPU 101. The CPU 101 calculates the subject brightness based upon the detection signal, and then executes exposure calculation by using the resulting brightness information.

Figure 3:
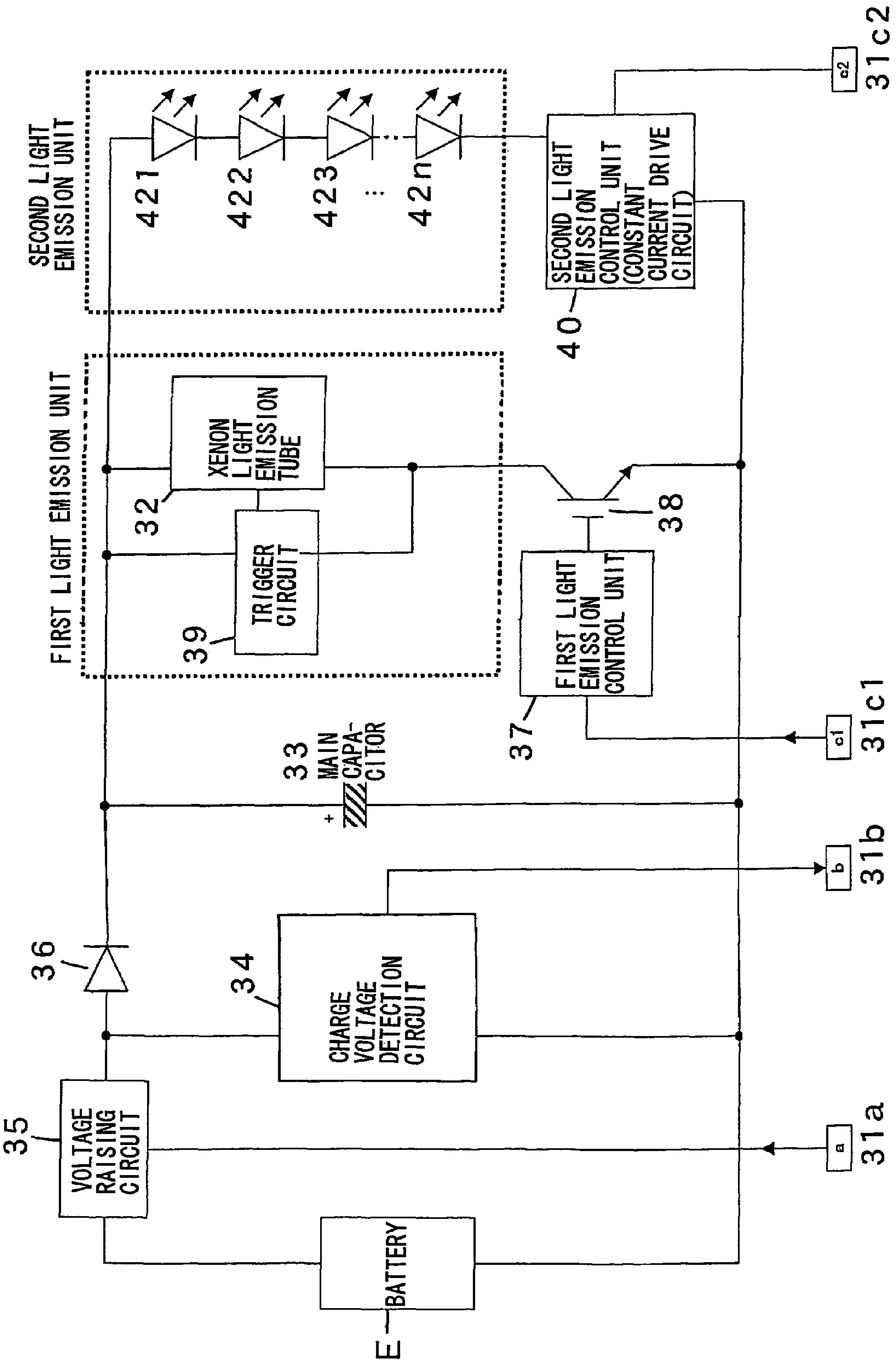
FIG. 3 is a detailed block diagram of the illuminating device.

FIG. 3 is a detailed block diagram of the illuminating device 30. The illuminating device 30 includes a voltage raising circuit 35, a diode 36, a charge detection circuit 34, a main capacitor 33, a first light emission unit comprising a xenon discharge tube (light emission tube) 32 and a trigger circuit 39, a first light emission control unit 37, a switching element 38, a second light emission unit constituted with n LEDs 421 through 42*n* and a second light emission control unit 40. Power supplied from a battery E is used to drive the illuminating device 30. The LEDs 421 through 42*n* correspond to the LED 42 in FIG. 2.

As the main switch (not shown) at the illuminating device 30 is turned on and a voltage-up start signal is input via a terminal 31*a*, the voltage raising circuit 35 in FIG. 3 raises the voltage from the battery E to, for instance, 330 V. The voltage raising circuit 35, which is a DC-DC converter, may adopt either a forward circuit structure or a flyback circuit structure. The main capacitor 33 is charged via the diode 36 with the raised voltage. As the charge voltage at the main capacitor 33 reaches a predetermined voltage level $V_E$, the charge detection circuit 34 turns on a pilot lamp (not shown) and also transmits a light emission preparation complete signal to the CPU 101 (see FIG. 2) at the camera body 10 via a terminal 31*b*. Together with terminals 31*c*1 and 31*c*2 to be detailed later, the terminal 31*a* and the terminal 31*b* constitute the terminal 31 in FIG. 2.

The discharge control for the xenon discharge tube 32 is executed as follows. In response to a light emission instruction signal transmitted from the CPU 101 at the camera body 10 via the terminal 31*c*1, the first light emission control unit 37 turns on the switching element 38. The switching element 38 may be constituted with, for instance, an IGBT (insulated gate bipolar transistor). The trigger circuit 39 generates a trigger voltage as the switching element 38 is turned on and applies the trigger voltage to a trigger electrode (not shown) at the xenon discharge tube 32. The trigger voltage thus applied excites the xenon gas inside the xenon discharge tube 32. A light emission current in a range of several tens through 100 A or higher flows through the xenon tube over a very short period of time, causing the xenon discharge tube 32 to emit flash light. In other words, the electrical energy having been stored inside the main capacitor 33 is discharged through the xenon discharge tube 32.

The xenon discharge tube 32 immediately starts light emission as soon as the switching element 38 is turned on, and its light emission intensity rises to the maximum level. The light emission intensity then becomes lower as the quantity of energy stored within the main capacitor 33 decreases, and the light emission ends once the main capacitor 33 becomes depleted of energy. The length of time to elapse before the light emission intensity decreases to ½ of the maximum value is generally referred to as a flash period, and the length of time to elapse before the discharge light emission ends is generally referred to as a full light emission period. It is to be noted that a controlled light emission is executed by controlling the light emission output based upon the cumulative value of values indicated by detection signals provided from a flash control photometering device (not shown) during the actual photographing operation. In the actual photographing operation, the power supply to the xenon discharge tube 32 stops before the full light emission period elapses. The discharge light emission inside the xenon discharge tube 32 is stopped by stopping the power supplied so as to control the quantity of light emitted through the xenon discharge tube 32 to achieve a predetermined light quantity value. It is to be noted that FIG. 3 does not include in illustration of the circuit for stopping the light emission at the xenon discharge tube 32.

The drive control for the n LEDs 421 to 42*n* connected in series is executed as described below. The LEDs 421 to 42*n* are LEDs identical to one another, and $(n \times Vf) < V_E(V)$ is true with regard to the LEDs, with Vf representing the forward voltage at each LED. It is ensured that the value of $(n \times Vf)$ is lower than at least the charge voltage at the main capacitor 33.

The second light emission control unit 40 is constituted with a constant current drive circuit. Upon receiving a light emission instruction signal and a light quantity instruction signal transmitted from the CPU 101 at the camera body 10 via the terminal 31*c*2, the second light emission control unit 40 determines the value of the current to be supplied to the LEDs 421 through 42*n* based upon the instruction contents and supplies the current achieving the value thus determined. The current thus supplied, which is generated with the energy having been stored in the main capacitor 33, drives the LEDs 421 through 42*n*, causing the LEDs 421 through 42*n* to emit light with a predetermined level of brightness. The second light emission control unit 40 ends the current drive of the LEDs 421 through 42*n* in response to a light emission end signal transmitted from the CPU 101 at the camera body 10 via the terminal 31*c*2. The light emission quantity at the LEDs 421 through 42*n* is controlled through the process described above.

Data indicating the relationship between the light emission brightness achieved with the LEDs 421 through 42*n* and the drive current level obtained through actual measurement are stored in advance as a table in a nonvolatile memory (not shown) in the second light emission control unit 40. The second light emission control unit 40 determines the correct current level needed to drive the LEDs by using the light emission brightness as an argument when referencing the table.

It is to be noted that when light emission by the illuminating device 30 is enabled, a specific light emission mode setting indicating that the light emission is to be achieved with the xenon discharge tube 32 or with the LEDs 421 through 42*n* is selected through a menu setting at the camera body 10, an operation at the operating member 107 or the like. Based upon the contents of the light emission mode setting, the CPU 101 transmits a light emission instruction signal for light emission at the first light emission unit or at the second light emission unit.

The following advantages are achieved in the first embodiment described above.

(1) The voltage raising circuit 35 and the main capacitor 33 are shared by the first light emission unit, which includes the xenon discharge tube 32 and the second light emission unit, which includes the LEDs 421 through 42*n*. This structure achieves reductions in the size and mass of the illuminating device and also a cost reduction, compared to a structure that includes a separate set of a voltage raising circuit and a main capacitor provided in conjunction with each of the first light emission unit and the second light emission unit.

(2) The LEDs 421 through 42*n* are driven with the current generated with the high voltage energy having been raised by the voltage raising circuit 35 and stored in the main capacitor 33. Accordingly, by setting the raised voltage value to be achieved by the voltage raising circuit 35 higher than the forward voltage $(n \times Vf)$ achieved with the n LEDs, the n LEDs 421 through 42*n* connected in series can be driven in a stable manner. This is particularly advantageous when n assumes a large value and numerous LEDs are connected in series. In addition, since the serial connection of the LEDs 421 through 42*n* allows equal values of current to be supplied to all the LEDs, the inconsistency in the light emission brightness levels achieved at the individual LEDs can be minimized and very consistent illuminating light can be provided.

Second Embodiment

Figure 4:
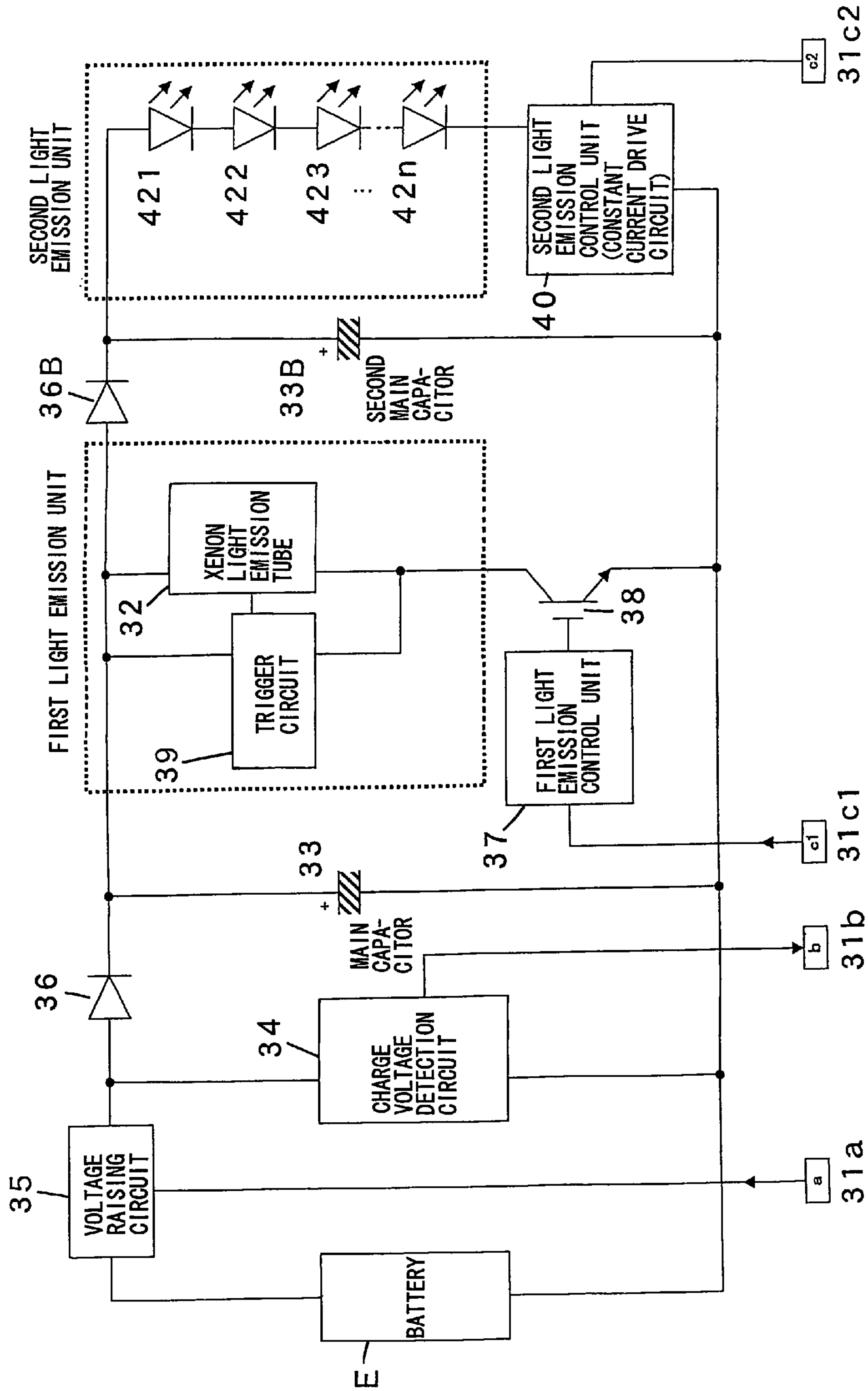
FIG. 4 is a detailed block diagram of the illuminating device achieved in a second embodiment.

An illuminating device 30 achieved in the second embodiment, which is ideal in applications that require the first light emission unit constituted with the xenon discharge tube 32 and the second light emission unit constituted with the LEDs 421 through 42*n* to be engaged in light emission at the same time, is now explained in reference to the detailed block diagram presented in FIG. 4. The illuminating device differs from that in FIG. 3 in that a main capacitor 33B and a diode 36B are added to be used in conjunction with the second light emission unit, and the following explanation focuses on these distinguishing features.

In the illuminating device 30 in FIG. 4, as the main switch (not shown) of the illuminating device 30 is turned on and a voltage-up start signal is input via the terminal 31*a*, the voltage raising circuit 35 raises the voltage from the battery E to, for instance, 330 V. The first main capacitor 33 is charged with the raised voltage via the diode 36, and the second main capacitor 33B is charged with the raised voltage via the diode 36B.

In response to a light emission instruction signal transmitted from the CPU 101 at the camera body 10 via the terminal 31*c*1, the xenon discharge tube 32 executes a discharge light emission with the electrical energy having been stored inside the first main capacitor 33.

In response to a light emission instruction signal and a light quantity instruction signal transmitted from the CPU 101 at the camera body 10 via the terminal 31*c*2, the LEDs 421 through 42*n* emit light by using the electrical energy having been stored in the second main capacitor 33B.

When light emission at the illuminating device 30 is enabled, a light emission mode setting for engaging both the xenon discharge tube 32 and the LEDs 421 through 42*n* in light emission is selected through a menu setting at the camera body 10, an operation at the operating member 107 or the like. Based upon the contents of the light emission mode setting, the CPU 101 transmits light emission instruction signals individually for light emission at the first light emission unit and for light emission at the second light emission unit.

The following advantages are achieved in the second embodiment described above.

(1) The voltage raising circuit 35 is shared by the first light emission unit, which includes the xenon discharge tube 32, and the second light emission unit, which includes the LEDs 421 through 42*n*. This structure achieves reductions in the size and mass of the illuminating device and also a cost reduction, compared to a structure that requires a separate voltage raising circuit provided in conjunction with each of the first light emission unit and the second light emission unit.

(2) Since the LEDs 421 through 42*n* are driven with the currents generated with the high voltage energy having been raised by the voltage raising circuit 35 and stored in the second main capacitor 33B, the n LEDs 421 through 42*n* connected in series can be driven in a stable manner as in the first embodiment (the raised voltage value to be achieved by the voltage raising circuit 35 should be set higher than the forward voltage (n×Vf) achieved with the n LEDs). In addition, the extent of inconsistency among the light emission brightness levels at the individual LEDs can be reduced.

(3) The main capacitors 33 and 33B are each provided in conjunction with one of the first light emission unit constituted with the xenon discharge tube 32 and the second light emission unit constituted with the LEDs 421 through 42*n*. Thus, even if the first main capacitor 33, for instance, becomes depleted of stored energy while both the first light emission unit and the second light emission unit are engaged in light emission, the second light emission unit is able to continuously emit light as long as there is stored energy in the second main capacitor 33B.

Third Embodiment

An illuminating device 30 achieved in the third embodiment, which operates in an optimal manner when the voltage at the battery becomes low, is explained. It is to be noted that since the structure of the illuminating device is similar to that adopted in the first embodiment, the explanation is given in reference to FIG. 3. In the third embodiment, light emission is enabled only at the second light emission unit constituted with the LEDs 421 through 42*n*, regardless of the contents of the light emission mode setting selected for the illuminating device 30.

When the voltage at the battery E becomes lower and the battery E enters a low voltage state, the level of the voltage raised by the voltage raising circuit 35 may not reach $V_E'$ representing the minimum voltage level (e.g., 330V) required for the light emission at the xenon discharge tube 32. In such a situation, the charge voltage detection circuit 34 judges that the detected voltage is equal to or higher than $V_E$ but less than $V_E'$. The charge voltage detection circuit 34 turns on a pilot lamp (not shown) and transmits a light emission preparation complete signal and a low battery voltage signal to the CPU 101 at the camera body 10 via the terminal 31*b*. It is to be noted that $(n \times Vf) < V_E$ (V), at least, is true with regard to the voltage $V_E$ achieved by the voltage raising circuit 35 by raising the voltage from the battery.

Upon receiving the low battery voltage signal input thereto, the CPU 101 outputs a light emission disable signal to the first light emission control circuit 37 via the terminal 31*c*1. In addition, it outputs a light emission instruction signal and a light quantity instruction signal to the second light emission control unit 40 via the terminal 31*c*2. Even when the xenon discharge tube 32 alone has been selected to execute light emission through a menu setting or an operation at the operating member 107, the light emission disable signal is allowed to take precedence over the light emission mode setting and the LEDs 421 through 42*n* are engaged in light emission.

The following advantage is achieved in the third embodiment described above. If a low voltage state manifests while light emission by the illuminating device 30 is enabled, the light emission at the xenon discharge tube 32 requiring a high voltage for light emission is forcibly disabled regardless of the light emission mode setting. At the same time, the LEDs 421 through 42*n*, requiring a lower level of voltage for light emission than the xenon discharge tube 32, are engaged in light emission. Thus, even if the user performs a photographing operation without realizing that the illuminating device 30 is in a low voltage state, light can be emitted by the illuminating device 30.

While the structure adopted in the third embodiment described above is similar to that adopted in the first embodiment, the third embodiment may instead be achieved by adopting a structure similar to the structure of the second embodiment.

The quantity n of the LEDs is arbitrary and it may be 2 or 10, or even a hundred or more LEDs may be used as long as the forward voltage (n×Vf) does not exceed the raised voltage value achieved by the voltage raising circuit 35.

While an explanation is given above on an example in which an external illuminating device 30 is mounted at the camera body 10, the camera body may include a built-in illuminating device instead.

In addition, while an explanation is given above on an example in which the camera body 10 is an electronic camera, the present invention may also be adopted in a film camera.

The above described embodiments are examples, and various modifications can be made without departing from the spirit and scope of the invention.

What is claimed is:

1. A photographic illuminating device, comprising:

a high voltage generating circuit that includes an input side and an output side, raises a voltage provided at the input side by a battery, and outputs a high voltage from the output side;

a discharge-controlled illumination unit that is electrically connected to the output side of the high voltage generating circuit, is driven with the high voltage output from the high voltage generating circuit and emits illuminating light in response to a light emission instruction;

a current-controlled illumination unit that is electrically connected to the output side of the high voltage generating circuit, is applied with the high voltage output from the high voltage generating circuit and emits illuminating light in response to a light emission instruction;

a mode selecting unit configured to be electrically connected to the discharge-controlled illumination unit and the current-controlled illumination unit and to select one of a first light emission mode in which the illuminating light emitted by the discharge-controlled illumination unit is used as illuminating light for photographing, and a second light emission mode in which the illuminating light emitted by the current-controlled illumination unit is used as illuminating light for photographing, the illuminating light for photographing controlling a brightness of a subject to be photographed; and a current control circuit that supplies a current needed for light emission at the current-controlled illumination unit by using the high voltage output from the high voltage generating circuit to the current-controlled illumination unit when the second light emission mode is selected by the mode selecting unit, wherein the high voltage generating circuit is commonly used by the discharge-controlled illumination unit and the current-controlled illumination unit.

2. A photographic illuminating device according to claim 1, wherein:

the high voltage generating circuit comprises a voltage raising circuit that raises a battery voltage and a capacitive element that is charged with the voltage having been raised by the voltage raising circuit;

the discharge-controlled illumination unit executes discharge light emission by using energy stored at the charged capacitive element; and the current control circuit supplies a current to the current-controlled illumination unit by using the energy stored at the charged capacitive element.

3. A photographic illuminating device according to claim 2, further comprising:

a control unit that controls light emission instructions provided to the discharge-controlled illumination unit and the current-controlled illumination unit; and a voltage detection circuit that detects the voltage generated by the high voltage generating circuit, wherein:

if the voltage detection circuit detects the high voltage raised at the voltage raising circuit to be equal to or lower than a first predetermined voltage value, the control unit issues a light emission instruction to the current control circuit without issuing a light emission instruction to the discharge-controlled illumination unit; and the current control circuit supplies a current to the current-controlled illumination unit by using the energy stored at the charged capacitive element.

4. A photographic illuminating device according to claim 3, wherein:

if the voltage detection circuit detects the voltage raised at the voltage raising circuit to be equal to or higher than a second predetermined voltage value, the control unit issues a light emission instruction to the current control circuit without providing a light emission instruction to the discharge-controlled illumination unit and the current control circuit supplies a current to the current-controlled illumination unit by using the energy stored at the charged capacitive element;

the first predetermined voltage value indicates a voltage needed in the discharge light emission at the discharge-controlled illumination unit; and the second predetermined voltage value, which is equal to or lower than the first predetermined voltage value, indicates a voltage needed for the light emission at the current-controlled illumination unit.

5. A photographic illuminating device according to claim 2, wherein:

the current-controlled illumination unit comprises a plurality of LEDs connected in series.

6. A camera that comprising:

a photographic illuminating device according to claim 2.

7. A photographic illuminating device according to claim 1, wherein:

the high voltage generating circuit comprises a voltage raising circuit that raises a battery voltage, and a first capacitive element and a second capacitive element that are charged with the voltage having been raised by the voltage raising circuit;

the discharge-controlled illumination unit executes discharge light emission by using energy stored at the charged first capacitive element; and the current control circuit supplies a current to the current-controlled illumination unit by using energy stored at the charged second capacitive element.

8. A photographic illuminating device according to claim 1, further comprising:

a control unit that controls light emission instructions provided to the discharge-controlled illumination unit and the current-controlled illumination unit; and a voltage detection circuit that detects the voltage generated by the high voltage generating circuit, wherein:

if the voltage detection circuit detects the high voltage generated at the high voltage generating circuit to be equal to or lower than a first predetermined voltage value, the control unit issues a light emission instruction to the current-controlled illumination unit without issuing a light emission instruction to the discharge-controlled illumination unit.

9. A photographic illuminating device according to claim 8, wherein:

if the voltage detection circuit detects the voltage generated at the high voltage generating circuit to be equal to or higher than a second predetermined voltage value, the control unit issues a light emission instruction to the current-controlled illumination unit without providing a light emission instruction to the discharge-controlled illumination unit;

the first predetermined voltage value indicates a voltage needed in the discharge light emission at the discharge-controlled illumination unit; and the second predetermined voltage value, which is equal to or lower than the first predetermined voltage value, indicates a voltage needed for the light emission at the current-controlled illumination unit.

10. A photographic illuminating device according to claim 7, wherein:

the current-controlled illumination unit comprises a plurality of LEDs connected in series.

11. A camera that comprising:

a photographic illuminating device according to claim 7.

12. A photographic illuminating device according to claim 7, further comprising:

a control unit that controls light emission instructions provided to the discharge-controlled illumination unit and the current-controlled illumination unit; and a voltage detection circuit that detects the voltage generated by the high voltage generating circuit, wherein:

if the voltage detection circuit detects the high voltage raised at the voltage raising circuit to be equal to or lower than a first predetermined voltage value, the control unit issues a light emission instruction to the current control circuit without issuing a light emission instruction to the discharge-controlled illumination unit; and the current control circuit supplies a current to the current-controlled illumination unit by using the energy stored at the second charged capacitive element.

13. A photographic illuminating device according to claim 8, wherein:

if the voltage detection circuit detects the voltage raised at the voltage raising circuit to be equal to or higher than a second predetermined voltage value, the control unit issues a light emission instruction to the current control circuit without providing a light emission instruction to the discharge-controlled illumination unit and the current control circuit supplies a current to the current-controlled illumination unit by using the energy stored at the charged second capacitive element;

the first predetermined voltage value indicates a voltage needed in the discharge light emission at the discharge-controlled illumination unit; and the second predetermined voltage value, which is equal to or lower than the first predetermined voltage value, indicates a voltage needed for the light emission at the current-controlled illumination unit.

14. A photographic illuminating device according to claim 12, wherein:

the current-controlled illumination unit comprises a plurality of LEDs connected in series.

15. A photographic illuminating device according to claim 13, wherein:

the current-controlled illumination unit comprises a plurality of LEDs connected in series.

16. A camera that comprising:

a photographic illuminating device according to claim 12.

17. A camera that comprising:

a photographic illuminating device according to claim 13.

18. A photographic illuminating device according to claim 1, wherein:

the current-controlled illumination unit comprises a plurality of LEDs connected in series.

19. A camera that comprising:

a photographic illuminating device according to claim 1.

20. A photographic illuminating device according to claim 1, further comprising:

a control circuit that controls light emission instructions provided to the discharge-controlled illumination unit and the current-controlled illumination unit, wherein the light emission instructions are issued at the same time.

21. A photographic illuminating device according to claim 1, further comprising:

a third light emission mode in which the illuminating light for photography is emitted by both the discharge-controlled illumination unit and the current-controlled illumination unit, wherein the mode selecting unit selects one of the first light emission mode, the second light emission mode and the third light emission mode, and both the discharge-controlled illumination unit and the current-controlled illumination unit emit illuminating light during photographing when the third light emission mode is selected by the mode selecting unit.

22. A photographic illuminating device according to claim 1, wherein the current-controlled illumination unit emits illuminating light for an exposure control.

23. A photographic illuminating device according to claim 1, wherein:

the discharge-controlled illumination unit emitting illuminating light from a predetermined surface; and the current-controlled illumination unit emitting illuminating light from a surface that is almost identical to the predetermined surface.

24. A photographic illuminating device according to claim 1, further comprising:

a capacitor charged with the raised voltage and storing energy, wherein the discharge-controlled illumination unit includes a discharge tube and emits an illuminating light by the discharge tube discharging the energy stored in the capacitor when the first light emission mode is selected, and the current-controlled illumination unit emitting illuminating light by using current based upon the energy stored in the capacitor when the second light emission mode is selected.

25. A photographic illuminating device according to claim 1, further comprising:

a first capacitor charged with the raised voltage and storing energy; and a second capacitor charged with the raised voltage and storing energy, the second capacitor being independent of the first capacitor, wherein the discharge-controlled illumination unit includes a discharge tube and emits an illuminating light by the discharge tube discharging the energy stored in the first capacitor when the first light emission mode is selected, and the current-controlled illumination unit emitting illuminating light by using current based upon the energy stored in the second capacitor when the second light emission mode is selected.

26. A photograph illuminating device according to claim 1, wherein the current-controlled illumination unit and the discharge-controlled illumination unit are connected in parallel with the high voltage generating circuit.

27. An apparatus comprising:

a voltage generating circuit including an input side and an output side, and raising a voltage provided at the input side, by a battery to output a raised voltage from the output side;

a discharge-controlled light emission unit electrically connected to the output side of the voltage generating circuit, using the raised voltage and emitting a first illuminating light controlling a brightness of a subject being photographed; and a current-controlled light emission unit electrically connected to the voltage generating circuit in parallel with the discharge-control light emission unit, using the raised voltage and emitting a second illuminating light controlling the brightness of the subject being photographed, so that the raised voltage output from the voltage generating circuit is used by both the discharge-controlled light emission unit and the current-controlled light emission unit.

28. An apparatus according to claim 27, wherein:

the discharge-controlled light emission unit emitting the first illuminating light from a predetermined surface; and the current-controlled light emission unit emitting the second illuminating light from a surface that is almost identical to the predetermined surface.

29. An apparatus according to claim 27, wherein the current-controlled illumination unit and the discharge-controlled illumination unit are connected in parallel with the high voltage generating circuit.

30. An apparatus comprising:

a voltage generating circuit including an input and an output side, and raising a voltage provided at the input side by a battery to output a raised voltage from the output side;

a capacitor electrically connected to the output side of the voltage generating circuit, charged with the raised voltage and storing energy;

a discharge-controlled light emission unit electrically connected to the capacitor, using the energy stored in the capacitor and emitting a first illuminating light controlling a brightness of a subject being photographed; and a current-controlled light emission unit electrically connected to the capacitor, using the energy stored in the capacitor and emitting a second illuminating light controlling the brightness of the subject being photographed, so that the energy stored in the capacitor is used by both the discharge-controlled light emission unit and the current-controlled light emission unit.

31. An apparatus according to claim 30, wherein;

the discharge-controlled light emission unit emitting the first illuminating light from a predetermined surface; and the current-controlled light emission unit emitting the second illuminating light from a surface that is almost identical to the predetermined surface.

32. An apparatus according to claim 30, wherein the current-controlled illumination unit and the discharge-controlled illumination unit are connected in parallel with the capacitor.

* * * * *